ns Patent [19]

Dickey et al.

[11] 4,065,242
[45] Dec. 27, 1977

[54] DEVICE FOR FACILITATING THE BENDING AND FORMING OF PLASTIC PIPE OR OTHER STRUCTURES

[75] Inventors: John W. Dickey, Stanardsville, Va.; Larry F. Babb, Sandusky, Ohio

[73] Assignee: Emerson Electric Co., St. Louis, Mo.

[21] Appl. No.: 703,527

[22] Filed: July 8, 1976

[51] Int. Cl.$^2$ ............................................ B29C 17/06
[52] U.S. Cl. ................................... 425/384; 425/393; 219/66
[58] Field of Search ............... 425/384, 392, 393, 390; 219/66, 153, 160; 72/466

[56] References Cited
U.S. PATENT DOCUMENTS

| | | | |
|---|---|---|---|
| 2,127,466 | 8/1938 | Reichel et al. | 425/392 |
| 3,279,237 | 10/1966 | Rader | 72/466 |
| 3,290,728 | 12/1966 | Pratt | 425/393 |
| 3,360,826 | 1/1968 | Lorang | 425/393 |
| 3,922,134 | 11/1975 | Kupfrian | 425/393 |
| 3,955,908 | 5/1976 | Farrell | 425/390 |

Primary Examiner—Lowell A. Larson
Attorney, Agent, or Firm—Polster, Polster and Lucchesi

[57] ABSTRACT

An apparatus for facilitating the bending and forming of plastic pipe or other devices is provided which includes an elastomer boot capable of expansion and contracting between a first diameter and a second diameter. The first diameter boot size permits boot insertion into the plastic pipe. The boot preferably is a tubular structure having a closed first end. An adapter is mounted along the second end of the boot, which seals the boot to fluid flow, except through the adapter. The adapter has an axial opening extending through it, which preferably is used to attach a coaxial conduit means to the boot. After insertion in the pipe, the boot is expanded to its second diameter size, that size conforming to the internal diameter of the pipe. Means for heating the pipe to bending or forming temperature through the boot also is provided. After reaching bending temperature, the pipe is bent to the desired shape. Thereafter, the pipe is cooled by circulating fluid through the boot by way of the conduit means. The conduit means, in one embodiment, is operatively connected to a hot or cold fluid supply through suitable control means. After the pipe cools and sets, the boot is returned to its first diameter size and removed.

11 Claims, 8 Drawing Figures

DUAL TANK SYSTEM

DEVICE FOR FACILITATING THE BENDING AND FORMING OF PLASTIC PIPE OR OTHER STRUCTURES

BACKGROUND OF THE INVENTION

This invention relates to bending and forming segments of plastic pipe, for example, constructed from a polyvinyl chloride material, and more particularly, relates to a device for facilitating the bending of such pipe and for preventing distortion of the side walls of the pipe during the bending operation. While the invention is described with particular emphasis on the pipe bending use, those skilled in the art will recognize the wider applicability of the invention.

The prior art reveals a number of apparatuses useful for facilitating the bending and forming of plastic pipe. Usually, these devices have included means for heating the pipe to its forming temperature, after which the pipe is formed to the desired shape. Thereafter, the pipe is cooled to set the pipe in its new configuration. The apparatus for accomplishing these formative steps range from relatively simple devices which merely heat the pipe to the bending temperature, to complex apparatus that at least semi-automatically bend and bell segments of plastic pipe to form a desired elbow.

While these prior art devices work well for their intended purposes, they do exhibit deficiencies. For example, with the simplest type of apparatus, that is, one that merely heats the pipe to softening temperature, no control is available during the pipe bending operation. That is to say, often the pipe side wall collapses during the bending operation, rendering the bent pipe section unfit for use. In addition, resistance or infrared heaters aften overheat the pipe, resulting in distortion and pipe damage even before bending is attempted. Larger and more automated devices, on the other hand, are not adaptable to on-sight construction use, and require relatively long set-up times for converting from pipe size to pipe size.

Our invention eliminates these prior art deficiencies by providing a device that is portable for on-sight construction use, which remains an essentially closed system throughout its operation, and is more suitable for handling by field personnel than other known designs. A major advantage of our invention is that is provides controlled heating of the pipe or other structure along the entire length of the workpiece.

One of the objects of this invention is to provide a simple to operate, low-cost device useful in bending and forming plastic pipe or other structures.

Another object of this invention is to provide an expandable mandrel for insertion within the tubular structure of a plastic pipe, which supports the internal wall of the structure in its inflated state and prevents internal wall deformation during bending or forming.

Another object of this invention is to provide a device for facilitating plastic pipe bending and forming which includes an elastomeric boot having first and second diametric positions, the first position permitting insertion and removal of the boot along the internal diameter of the plastic pipe, the second position conforming to an internal diameter of the plastic pipe so as to support the internal side wall of the pipe during bending.

Yet another object of this invention is to provide an elastomeric boot insertable in a plastic pipe, the boot functioning both as a support for the plastic pipe and as the heat and coolant carrying medium for alternatively softening and setting the material from which the pipe is made.

Another object of this invention is to provide an elastomeric boot that can be used to expand the circumference of plastic pipe or structures, thereby forming a bell segment or other desired shape.

Another object of this invention is to provide a closed system apparatus for softening and supporting a plastic pipe during bend formation.

Other objects of this invention will be apparent to those skilled in the art in light of the following description and accompanying drawings.

SUMMARY OF THE INVENTION

In accordance with this invention, generally stated, an elastomeric boot having thermal conduction properties is provided, the structure of which includes a tubular cross section and a sealed first end. The boot functions as an expandable mandrel and is capable of assuming a first diameter size for insertion in a length of plastic pipe, and a second diameter size for supporting the internal wall of the pipe when bending operations are conducted on the pipe. A second end of the boot receives an adapter, the adapter having an axial opening through it, which communicates with an internal chamber defined by the boot structure. A conduit means having two passageways in it also is operatively connected to at least one source of fluid pressure. Means is provided for heating the pipe through the boot when the boot is in an inflated condition. Means also is provided for cooling the pipe through the boot upon completion of the bending operation. Preferably, hot and cold fluid may be pumped into the boot structure for performing the softening and setting operation. Alternatively, the heating means comprises a resistive heater device carried by the boot structure.

DESCRIPTION OF THE PREFERRED EMBODIMENT

Figure 1:
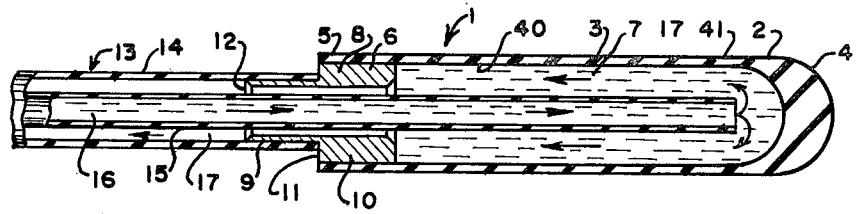
FIG. 1 is a cross sectional view of one illustrative embodiment of pipe heating and bending device of this invention.

Referring now to FIG. 1, reference numeral 1 indicates one illustrative embodiment of a mandrel useful in plastic pipe forming operations. The mandrel 1 includes an elastic boot 2, an adapter 6 and conduit means 13.

The boot 2 is defined by a tubular body part 3 having an inner wall 40, outer wall 41, a first end 4, and a second end 5. In the embodiment illustrated, the end 4 is closed, while the end 5 is open and is sized to receive the adapter 6.

The body part 3 encompasses a chamber 7, closed at the end 4 by the material of the boot 2, and at the end 5 by the adapter 6. The material utilized for the boot 2, as indicated above, is elastic or expandable so that the body section 3 of the boot 2 is capable of assuming a first, smaller diameter insertion size 45, and a second, larger diameter side wall supporting size 46, best compared in FIGS. 3 and 4. Ethylene propylene with a diene monomer or epichlorohydrin material is acceptable for boot 2 construction, for example.

The adapter 6 includes a body 8 having a first diameter portion 9 and a second larger diameter portion 10 joined to one another so as to define a lip 11. The larger diameter portion 10 is inserted within the boot 2 along the boot end 5, and is secured to the boot 2 by any convenient method. Some form of compression connection works well, for example. In any event, the junction between the adapter 6 and the boot 2 is impervious to fluid flow. The adapter 6 has an axial opening 12 through it, which communicates with the chamber 7.

The conduit means 13 is attached to the adapter 6 along the diameter portion 9. Again, attachment may be made by any convenient method. Conduit means 13 includes an outer tubular structure 14 and an inner tubular structure 15 arranged coaxially with respect to one another to define a first flow passage 16 and a second flow passage 17. In the embodiment illustrated, the passage 17 is radially outboard of the passage 16. The structure 15 has an external diameter less than the diameter of the axial opening 12 in the adapter 6, so that the passage 17 communicates with the chamber 7. The structure 15 also extends within the chamber 7 for a substantial distance, so that it terminates near the end 4 of the boot 2. The passageway 16 defines an inlet for fluid flow to the chamber 7, while the passageway 17 defines an outlet for fluid flow from the chamber 7. The termination of the structure 15 near the end 4 of the boot 2 is important for several reasons. For example, fluid entering the chamber 7 from the passageway 16 will flow along the entire interior wall 40 of the boot 2. Consequently, the entire wall 40 is available for heat transfer through the material thickness of the boot.

Figure 3:
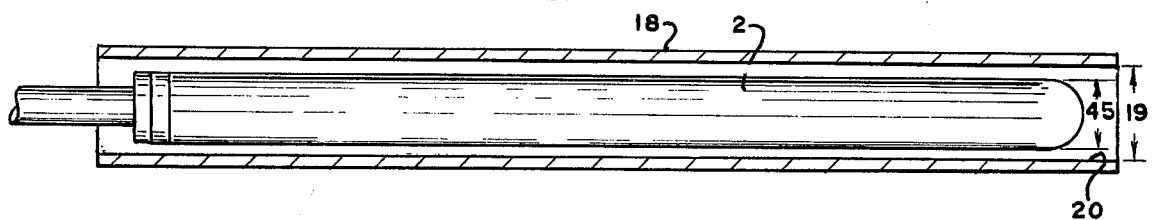
FIG. 3 is a view in side elevation, partly in section and partly broken away, showing the device of this invention in its insertion position.
Figure 4:
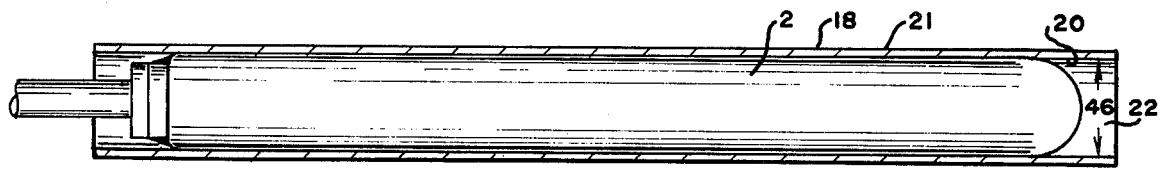
FIG. 4 is a view in side elevation, partly in section and partly broken away, showing the device of this invention in the configuration utilized during pipe forming operations.
Figure 5:
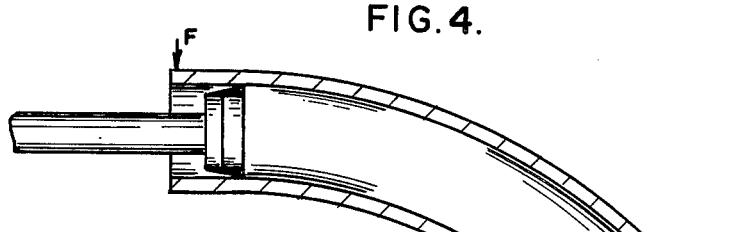
FIG. 5 is a view in side elevation, partly in section and partly broken away, illustrating the force application for forming a plastic pipe section.
Figure 6:
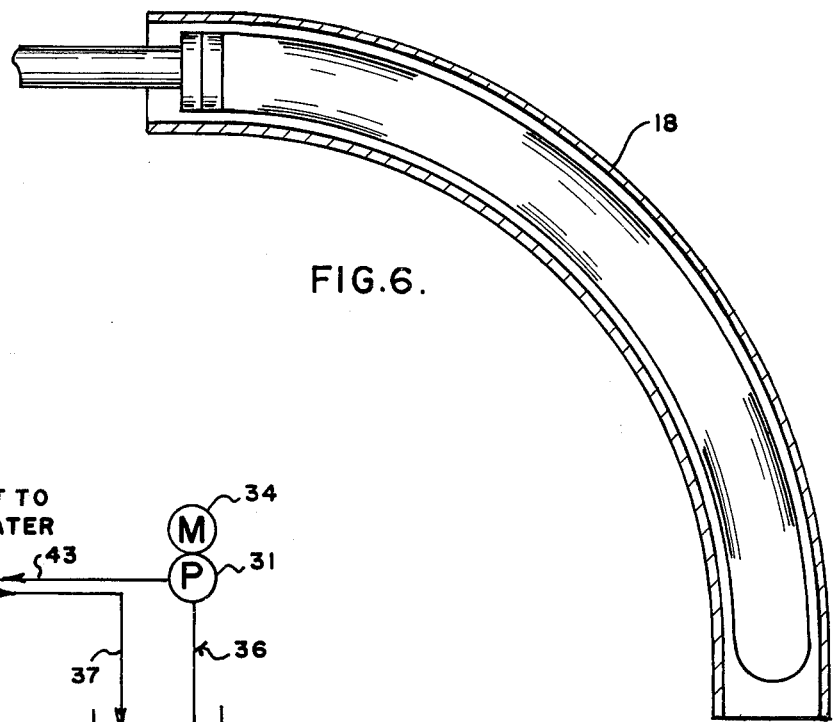
FIG. 6 is a view in side elevation, partly in section and partly broken away, illustrating removal of the device of this invention upon completion of the forming and setting steps.

As shown in FIG. 3, the boot 2 is inserted in a plastic pipe 18 having an interior diameter 19, the boot 2 being in its small diameter, non-inflated condition. After insertion, the boot 2 is inflated, as later described in greater detail, to its second, wall supporting size. The plastic pipe 18 is conventional, and generally is a tubular structure having an internal wall 20 and an external wall 21, having a material thickness therebetween. The wall 20 defines an axial opening 22 through the pipe 18, the diameter of the opening 22 corresponding to the diameter 19. The boot 2 is sized so as to permit its easy reception along the opening 22 and internal diameter 19 of the pipe 18 in the first diameter size 45 of the boot, while the second diameter size 46 of the boot 2 supports the inner wall 20 of the pipe 18. Bending of the pipe 18 is accomplished in a conventional manner. That is, as described hereinafter, the pipe 18 is heated to softening temperature, and forces necessary to bend the pipe 18 to the desired configuration are applied to the pipe. An illustrative example of the applied forces for pipe 18 formation is shown in FIG. 5. As indicated, the boot 2 supports the internal wall 20 of the pipe 18 during forming, and prevents buckling of the pipe during that operation. After bending, the boot 2 is returned to its first, small diameter size 45, and removed from the pipe 18.

Figure 2:
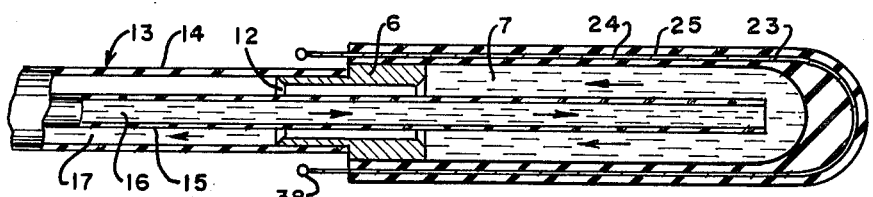
FIG. 2 is a sectional view of a second illustrative embodiment of pipe heating and forming device of this invention.

A boot 23, shown in FIG. 2, is similar to the boot 2 of FIG. 1, except that the boot 23 has a heater means 24 associated with a side wall 25 of the boot. Heater means 24 may be a resistance wire device carried by the side wall 25, or the side wall 25 may be constructed at least in part from conductive rubber material. The electrical connection of the heater means 24 to a source of electrical energy may be made through the adapter 6 in a conventional manner. The remaining structural features of the boot 23 are similar to those described in conjunction with the boot 2 and are not described in detail. The use and purpose of the heater means 24 is discussed hereinafter.

Figure 7:
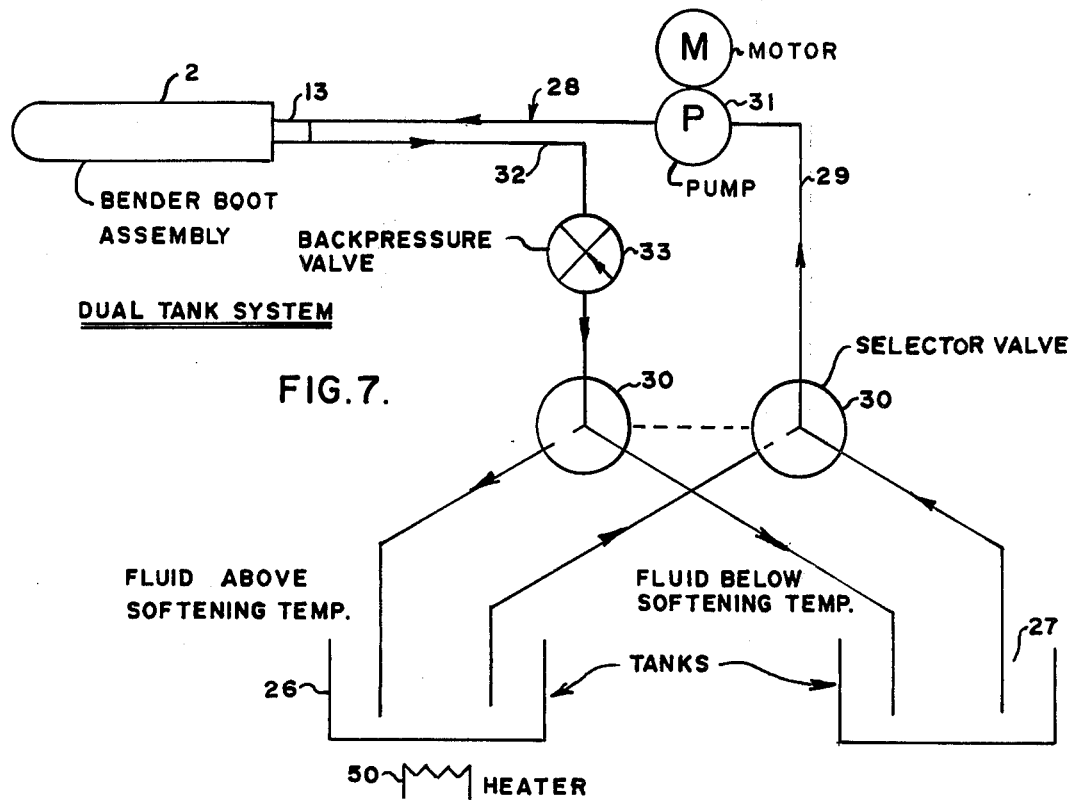
FIG. 7 is a diagrammatic view of a fluid system compatible with the device embodiment of FIG. 1.

Heating of the pipe 18 to softening temperature may be accomplished in a variety of ways. With the boot 2 structure of FIG. 1, the conduit means 13 is operatively connected to a source of high temperature fluid 26 and a source of low temperature fluid 27 through a pipe system 28, diagrammatically illustrated in FIG. 7. A suitable heater device 50 may be employed to maintain proper fluid temperature at the high temperature fluid source 26.

The pipe system 28 includes an input line 29 operatively connected between the flow passageway 16 of the conduit means 13 and a selector valve means 30. A fluid pump 31 is interposed in the input line 29 intermediate the selector valve 30 and the conduit means 13. The passageway 17 of the conduit means 13 is operatively connected to an output line 32, which extends between the passageway 17 and the selector valve means 30 through a back pressure valve 33. The valve selector means 30 is a conventional device which enables an operator to connect either of the hot or cold fluid sources 26 and 27 to respective ones of the input line 29 and the output line 32.

The pump means 31 also is conventional and a variety of commercially available devices may be used. Means for driving the pump, conventionally a dynamoelectric machine, is encompassed in the term pump means for the purpose of this specification. The suction side of the pump means 31 is operatively connected to the selector valve means 30, while the discharge side of the pump means is operatively connected to the conduit means 13.

The back pressure valve 33 also is conventional, and is utilized to restrict flow and control pressure within the boot. Alternatively, means may be provided to regulate the speed of the pump means 31, thereby controlling fluid pressure in the boot.

As indicated above, the selector valve means 30 is positioned to enable the pump means 31 to supply fluid from the high temperature fluid source 26 into the boot 2 to soften the pipe 18 to forming temperature. Thereafter, the pipe is bent into the desired configuration. Bending may be accomplished by hand, or some type of mechanized forming apparatus may be provided, if desired. After forming, the selector valve means 30 is adjusted so that it now pumps fluid from the low temperature fluid source 27 through the boot 2. The passage of low temperature fluid through the boot 2 cools the pipe 18 below softening temperature, and sets the pipe 18 in the desired shape.

Figure 8:
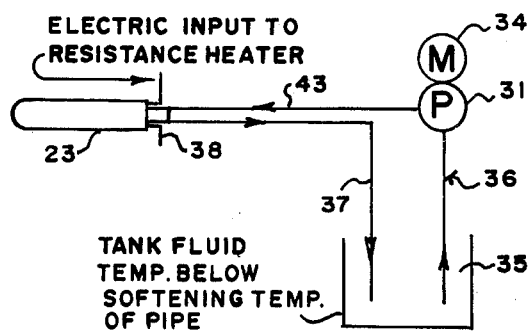
FIG. 8 is a diagrammatic view of an electrical and fluid system compatible with the device embodiment of FIG. 2.

The boot 23 operates in a substantially similar manner, except that only a single cold fluid source 35 is provided. A pipe system 36 includes an inlet pipe 43 operatively connected between the fluid source 35 and the passageway 16 of the boot 23 through a suitable pump and motor combination, again shown by the numeral 31. An outlet pipe 37 of the pipe system 36 is connected between the passageway 17 and the fluid source 35. Conductor means 38 is provided for electrically connecting the heater means 24 of the boot 23 to a source of electrical energy, not shown. The back pressure valve 33 also may be placed in the outlet line 37, if desired. However, those skilled in the art will recognize that both of the pipe systems 36 and 28 are closed systems. Consequently, either of the systems shown in FIG. 7 or FIG. 8 may operate in a pressure balancing relationship so that a specific valve for balancing pressure may not be required. In any event, fluid is pumped into the chamber of the boot 23 to enlarge the boot 23 to wall engaging and supporting relationship. Thereafter, the heater means 24 is energized to raise the temperature of the pipe 18 to softening temperature. Thereafter, electrical energy input to the heater 24 is removed, and the pipe 18 is formed into the desired shape in a manner similar to that described above. Low temperature fluid from the source 35 then is circulated through the boot 23 to set the new shape of the pipe 18. The boot 23 then is returned to its original size for removal.

The boot embodiments thus described meet all of the ends and objects set forth above. The systems described simplify field installation of plastic pipe to an extent unrealized with prior art devices. Thus, for example, alignment requirements between pipe systems are less critical because the mandrel 1 may be inserted in an end of misaligned pipe, the pipe softened, and then reset into alignment. This feature is especially important when two pipe systems previously have been fixed in position prior to their required interconnection. The closed nature of the mandrel systems described also means that the cooling and heating fluids need not be handled by field personnel.

Numerous variations, within the scope of the appended claims, will be apparent to those skilled in the art in light of the foregoing description and accompanying drawings. Thus, the design silhouette of various components forming the mandrel 1 may vary in other embodiments of this invention. Likewise, while certain material used in mandrel 1 construction was described as preferred, other materials may be utilized, if desired. Various safety features can be added. For example, pressure selector means may be included to limit pressure build-up in the boot to prevent boot rupture. Physical dimensions of the mandrel 1 may vary, depending on pipe 18 size. The interconnection between the adapter 6 and the boot 2 may be altered so that adapter/boot diameters are variable over a range of pipe 18 sizes. The boot 2 itself may be adaptable to various pipe sizes. Generally, however, an individual boot and an associated adapter will be required for each nominal pipe size. While the conduit means was described as coaxial, those skilled in the art will recognize that separate fluid conduits may be used, if desired. Although the invention has been described in conjunction with its pipe forming function, it should be apparent that the apparatus disclosed may be used in a number of other applications, with a variety of structures in place of or in addition to plastic pipe. For example, the boot 2 may be pressurized at the softening temperature so that it expands or forms a particular structure into a desired shape. Upon attainment of the desired shape, fluid again is circulated in the boot 2 to cool the structure. This method of application is particularly suitable in forming "bell" segments. These variations are merely illustrative.

Having thus described the invention, what is claimed and desired to be secured by Letters Patent is:

1. A device for facilitating the bending and forming of a structure having an internal wall defining an opening in said structure, which comprises:
   a tubular elastomer boot having a first closed end and a second end, said elastomer boot defining a mandrel insertable in said structure for supporting the internal wall of said structure, said boot having a first diameter for insertion and a second diameter for supporting the internal wall of said structure, said elastomer boot including a support wall;
   adapter closure means mounted to the open end of said boot, said adapter means forming a fluid seal for said boot along the open end of said boot, said adapter having an axial opening in it;
   conduit means attached to said adapter, said conduit means including first and second passageways communicating with said tubular boot, said conduit means forming a fluid seal with said adapter means; and
   means for heating said structure to bending temperature by heat transfer outwardly from said elastomer boot to said structure, said heater means comprising an electrically operable device associated with said support wall.

2. The device of claim 1 wherein the first and second passageways of said conduit means are arranged coaxially, said conduit means including an inner tubular structure defining one of said first and said second passageways, said inner tubular structure extending inwardly of said boot to a position near the closed end of said boot, so that fluid flow between said first and said second passageways travels in a path substantially the entire length of said boot.

3. The device of claim 2 further characterized by fluid source means for supplying a quantity of fluid, said fluid source means having an outlet and an inlet, pump means having a suction side and a discharge side, the suction side of said pump means being operatively connected to the outlet of said fluid source means, and the discharge side of said pump being operatively connected to one of said first and said second passageways, the inlet of said fluid source means being operatively connected to the other of said first and second passageways of said conduit means.

4. A device for facilitating the bending and forming of a structure, which comprises:
   an inflatable mandrel having a first small diameter and a second large diameter size, said mandrel having a flexible side wall with a closed first end, and an open second end, said mandrel delimiting a chamber;
   adapter means closing the open end of said mandrel, said adapter means having an axial opening in it;
   conduit means attached to said adapter means, said conduit means including a first flow passageway and a second flow passageway, said first and said second flow passageways communicating with said chamber defined by said mandrel through the opening in said adapter means; and means for heating the structure to be formed to bending temperature, said heating means adapted to transfer energy from said mandrel to said structure, said heating means being capable of raising the structure to bending temperature by heat transfer radially outwardly through said structure, said heating means including an electrically operable heating device mounted along the flexible side wall of said inflatable mandrel.

5. The device of claim 4 further characterized by fluid source means for supplying a quantity of fluid, said fluid source means having an outlet and an inlet, pump means having a suction side and a discharge side, the suction side of said pump means being operatively connected to the outlet of said fluid source means, and the discharge side of said pump being operatively connected to one of said first and said second flow passages, the inlet of said fluid source means being operatively connected to the other of said first and said second flow passages of said conduit means.

6. A device for facilitating the bending and forming of plastic pipe structure during field installation by an installer of said plastic pipe, said plastic pipe having an internal wall defining an opening in said pipe, which comprises:

a tubular elastomer boot having a first closed end and a second end, said elastomer boot defining a mandrel insertable in said pipe for supporting the internal wall of said pipe during bending thereof, said boot having a first diameter for insertion and a second diameter for supporting the internal wall of said pipe, said boot being capable of manual handling by said installer;

adapter closure means mounted in the open end of said boot, said adapter means forming a fluid seal for said boot along the open end of said boot, said adapter having an axial opening in it;

conduit means attached to said adapter, said conduit means including first and second passageways communicating with said tubular boot, said conduit means forming a fluid seal with said adapter means; and means for heating said structure to bending temperature by heat transfer outwardly from said elastomer boot to said structure, said heating means, conduit means, adapter closure means and elastomer boot forming a closed system to permit and to facilitate manual handling by said installer.

7. The device of claim 6 wherein said heater means comprises a hot fluid tank for heating a fluid insertable in said boot, said hot fluid tank having an inlet and an outlet, further including:

a cold fluid tank, said cold fluid tank having an inlet and an outlet;

selector valve means operatively connected between said hot and said cold fluid tanks, said valve means being selectively engagable to connect the outlet of one of said hot and said cold fluid tanks to a pump means and the inlet of said last mentioned hot and cold fluid tanks to one of said first and said second passageways of said conduit means; and pump means having a suction side and a discharge side, the suction side of said pump being operatively connected to said selector valve means, the discharge side of said pump means being operatively connected to the other of said first and said second passageways of said conduit means.

8. The device of claim 6 wherein said elastomer boot comprises a support wall, said heating means comprising an electrically operable device associated with said support wall.

9. The device of claim 8 wherein the first and second passageways of said conduit means are arranged coaxially, said conduit means including an inner tubular structure defining one of said first and said second passageways, said inner tubular structure extending inwardly of said boot to a position near the closed end of said boot, so that fluid flow between said first and said second passageways travels in a path substantially the entire length of said boot.

10. The device of claim 9 further characterized by fluid source means for supplying a quantity of fluid, said fluid source means having an outlet and an inlet, pump means having a suction side and a discharge side, the suction side of said pump means being operatively connected to the outlet of said fluid source means, and the discharge side of said pump being operatively connected to one of said first and said second passageways, the inlet of said fluid source means being operatively connected to the other of said first and said second passageways of said conduit means.

11. The device of claim 10 further characterized by means for controlling fluid pressure in said boot operatively connected to said boot.

* * * * *

UNITED STATES PATENT AND TRADEMARK OFFICE
CERTIFICATE OF CORRECTION

PATENT NO. : 4,065,242
DATED : December 27, 1977
INVENTOR(S) : John W. Dickey and Larry F. Babb It is certified that error appears in the above–identified patent and that said Letters Patent are hereby corrected as shown below:

Abstract of the Disclosure, line 3, "contracting" should be "contraction".

Column 1, line 35, "aften" should be "often"; line 46, "is that is" should be "is that it".

Signed and Sealed this

Sixth Day of June 1978

[SEAL]

Attest:

RUTH C. MASON
Attesting Officer

DONALD W. BANNER
Commissioner of Patents and Trademarks